(12) United States Patent
Reynolds

(10) Patent No.: US 11,758,356 B2
(45) Date of Patent: Sep. 12, 2023

(54) SYSTEM AND METHOD FOR MATCHING BASED ON PROXIMITY

(71) Applicant: TAVISH SOFTWARE INC, Ann Arbor, MI (US)

(72) Inventor: Nathan Reynolds, Ann Arbor, MI (US)

( * ) Notice: Subject to any disclaimer, the term of this patent is extended or adjusted under 35 U.S.C. 154(b) by 174 days.

(21) Appl. No.: 17/370,963

(22) Filed: Jul. 8, 2021

(65) Prior Publication Data
US 2023/0009450 A1    Jan. 12, 2023

(51) Int. Cl.
*H04W 24/00* (2009.01)
*H04W 4/02* (2018.01)
*H04W 8/00* (2009.01)
*H04W 4/80* (2018.01)
*G06F 16/2457* (2019.01)
*H04W 8/18* (2009.01)
*G01S 19/42* (2010.01)
*H04W 84/12* (2009.01)

(52) U.S. Cl.
CPC ...... *H04W 4/023* (2013.01); *G06F 16/24578* (2019.01); *H04W 4/80* (2018.02); *H04W 8/005* (2013.01); *H04W 8/18* (2013.01); *G01S 19/42* (2013.01); *H04W 84/12* (2013.01)

(58) Field of Classification Search
CPC ....... H04W 4/023; H04W 8/005; H04W 4/80; H04W 8/18; H04W 8/00; H04W 84/12; H04W 4/02; G06F 16/24578; G06F 16/2457
USPC .............................................. 455/456.1, 41.2
See application file for complete search history.

(56) References Cited

U.S. PATENT DOCUMENTS

| | | | | |
|---|---|---|---|---|
| 11,290,979 B2 * | 3/2022 | Dowlatkhah | ......... | H04L 67/565 |
| 2006/0209744 A1 * | 9/2006 | Tischer | .................... | H04W 4/02 |
| | | | | 370/328 |
| 2008/0248801 A1 * | 10/2008 | Fletcher | .................. | H04W 4/02 |
| | | | | 455/435.2 |
| 2009/0271244 A1 * | 10/2009 | Kalasapur | .............. | G06Q 50/01 |
| | | | | 705/319 |
| 2015/0080030 A1 * | 3/2015 | Moldavsky | ............. | H04W 4/80 |
| | | | | 455/456.3 |
| 2016/0095140 A1 * | 3/2016 | Gupta | .................... | H04W 4/023 |
| | | | | 370/312 |
| 2016/0205197 A1 * | 7/2016 | Yasrebi | .................... | H04L 67/14 |
| | | | | 709/204 |
| 2016/0234635 A1 * | 8/2016 | Chen | ........................ | H04W 4/33 |
| 2017/0164315 A1 * | 6/2017 | Smith | .................... | G01S 5/0284 |
| 2017/0180938 A1 * | 6/2017 | Smith | .................. | G01C 21/165 |
| 2017/0238136 A1 * | 8/2017 | Smith | .................. | H04W 4/023 |
| | | | | 455/456.3 |
| 2019/0139157 A1 * | 5/2019 | Lobb | ....................... | G06Q 50/01 |
| 2021/0058742 A1 * | 2/2021 | Peterson | ................. | H04W 4/50 |

(Continued)

FOREIGN PATENT DOCUMENTS

WO    WO-2012094235 A2 *   7/2012    ............. G06Q 50/01

*Primary Examiner* — Marceau Milord
(74) *Attorney, Agent, or Firm* — Thomas Heed; Heed Law Group PLLC

(57) ABSTRACT

A system and method for in-person proximity matching that allows a plurality of user electronic devices to identify and match with one another based on a compatibility profile. The matching is done using a near-field communication protocol, such as Bluetooth or Wi-Fi. The invention allows matching of users when they are within the near proximity, which is defined as approximately 1000 meters.

16 Claims, 4 Drawing Sheets

(56) References Cited

U.S. PATENT DOCUMENTS

| | | | |
|---|---|---|---|
| 2021/0337460 A1* | 10/2021 | Breaux, III | H04W 4/027 |
| 2022/0061015 A1* | 2/2022 | Dowlatkhah | H04W 64/003 |
| 2022/0248188 A1* | 8/2022 | Jones | H04W 4/80 |
| 2023/0013744 A1* | 1/2023 | Alharayeri | H04L 67/56 |

* cited by examiner

SYSTEM AND METHOD FOR MATCHING BASED ON PROXIMITY

FIELD OF INVENTION

This invention relates to the classifications for recognition of data, presentation of data, record carriers, and handling record carriers; and one or more sub-classifications related to methods or arrangements for recognition using electronic means. Specifically, this invention is a system and method for matching people in immediate proximity with one another.

BACKGROUND OF INVENTION

As social media has proliferated, suicide has increased. People do not receive the human contact that they deeply desire by using social media. Electronic devices tend to isolate people from their peers Additionally, in typical public settings, numerous barriers exist to meeting and interacting with strangers, including social stigmas, individual social anxieties, and low probabilities of finding chemistry or commonalities with random strangers. Previous attempts to facilitate interactions between strangers such as social media, dating, and group event platforms fall short in several notable capacities. Online platforms decrease the perceived commitment required but rarely result in substantive interactions or relationships. Even if users on social media or dating platforms meet in person, it requires significantly greater involvement, and finding another compatible user requires additional searching or selection. Group events offer an alternative, offering compatibility based on interest in the event theme, but require prior planning and a break in routine, while also being limited to commonalities viable as event themes. Thus, the current, increasingly prevalent solutions commonly lead to dissatisfying online interactions, arguably resulting in greater loneliness and higher rates of associated mental conditions for users dependent on such solutions. Additionally, the social engagement that is possible with current solutions is often stultifying.

A system which detects users in close proximity, enables selection for specific commonalities, and facilitates interactions in real time, all occurring within a user's ordinary routine, offers an elegant solution to the aforementioned problems. This solution is not limited to a particular domain, such as dating, but rather offers any measure of potential interactions, allowing each user to select in real time which types of interactions to pursue.

Example interactions could include students enrolled in a common course meeting at a library, potential exercise partners meeting at a gym, potential romantic pairings meeting at a bar, or professionals in a common field meeting at a conference. This system would improve such scenarios in two distinct ways. First, such a system would act as an "ice-breaker", minimizing or eliminating the perceived barriers to beginning an interaction, such as social awkwardness, social anxiety, and the fear of rejection. Second, such a system would act as a ready selection mechanism, introducing users who share at least one compelling interest, namely the interest that made them go out in public in the first place. Current social media and dating apps have left a hole in the marketplace, by failing to provide a mechanism to introduce people who are already in the same physical location.

SUMMARY OF THE INVENTION

This summary is intended to disclose the present invention, a system and method for in-person matching based on proximity. The simplest embodiment is a system for real-time, in-person proximity matching between two or more user devices. This system includes a first user device determining an approximate location using one or more of the first user device's GPS system, cell towers, and Wi-Fi networks. This first user device communicates this location to a server, the server queries a database of users for proximate user devices, the server optionally sorts the resulting list of proximate user devices by compatibility with the first user, the server notifies the proximate user devices from this list of the first user device's presence nearby, and the server returns the list of proximate user devices to the first user device.

This system further includes the first user device advertising its unique identifier for brief time. Upon receiving the list of proximate user devices returned by the server, the first user device independently scans for the unique identifiers of each proximate user device. Simultaneously, the first user device advertises its own unique identifier. Similarly, other user devices, such as those included on the list of proximate user devices returned to the first user device, scan for unique identifiers from their own respective list of proximate user devices. Upon receiving a notification from the server of a new proximate user device, such as the first user device, this second user device adds the new unique identifier to its respective scan list, and concurrently advertises its own unique identifier on receiving this notification.

When a first user device discovers the unique identifier of one or more second user devices, the first user device notifies the server of this discovery, and the server notifies the discovered second user devices of this discovery. The discovery triggers the display of the match on the first user device and a notification sent to the first user of one or more proximate matches, and the notification of the discovery sent to the second user device triggers the display of the match on the second user device and a notification sent to the second user of one or more proximate matches.

Prior to using the present invention, a system and method for in-person matching based on proximity, a user would register answering questions related to demographics and interests, in order to create a compatibility profile. A user may create a narrow compatibility profile, allowing only those sharing substantially similar demographic and interest profiles to be matched with the user. A user may also create a broad compatibility profile, essentially allowing anyone in near proximity to be matched with the user. A user may also create an intermediate compatibility profile, somewhat restricting who in the near proximity can be matched with the user.

The user has a user device, referred to here as the first device. The user of the first device wants to meet someone in near proximity. The maximum effective transmission radius of Class 1 Bluetooth is 100 meters. The maximum effective transmission radius for a single WiFi router in an open space is approximately 300 ft, or about 90 meters. From a practical standpoint, near proximity in this case means something no more than an order of magnitude greater than the maximum effective transmission radius that a near-field wireless communication protocol, such as Bluetooth or Wi-Fi, can broadcast. In other words, near proximity means something within 1000 meters. Near proximity matching would be ideal for forums such as a museum, a store, a gym, a university building, a library, and the like. Each user device has a unique identifier, established by the near-field wireless communication protocol.

The first device initiates the method of the present invention. The first device determines its location; advertises itself by its unique identifier, such as a Bluetooth identifier; and sends is location to the server via a communication channel.

The server receives the first device's location information and interprets it as a request to meet those in near proximity. The server sends a query to the database, containing all the user profiles. The server requests devices near the first device. The server sorts the results of the query by user compatibility. The server then notifies devices, such as the second device, of the first device's presence and desire to meet, using a communication channel. If no devices exist within the near-field of the first device, the first device is so notified. The presence of the first device is tracked in the event that a second device within the near-field of the first device makes a request.

Each active device in the near-field that has already initiated itself has a scan list, showing the other devices in the near-field. The other devices receive the first device's unique identifier, which each of the other devices add to their respective scan list. The notification to each of the other devices would tell the other devices about the interests of the user of the first device, along with their demographic details. Upon receiving the first device's unique identifier, the other devices begin advertising their own unique identifiers, if they were not already doing so.

The server also returns a list of nearby devices to the first device, using the far-field communication channel. Upon receiving the return list, the first device scans the list for the unique identifiers of nearby devices.

Once the first device and a second device have each received a scan list from the server, and both devices have begun advertising their respective unique identifiers, the users of the devices may match themselves, if interested.

This is done, for example, by the second device advertising its unique identifier. The first device discovers the second device's unique identifier and notifies the server using the communication channel. The server notifies the second device of the match using the communication channel. The first device displays the match and notifies the user of the available match(es). When both users, accept the match, the first device and the second device communicate to each other directly using the near field communication channel.

The system is comprised of a plurality of devices having the ability to transmit and receive using a near-field wireless communication protocol, such as Bluetooth and Wi-Fi, as well as the ability to transmit and receive using a far-field wireless communication protocol, such as cellular or satellite; a server having, at least, a processor and a non-transitory memory element; a database accessible to the server; a first computer-readable, non-transitory instruction set; a second computer-readable, non-transitory instruction set; a near-field communication channel; and a far-field wireless communication channel. Each of the plurality of devices has an input, an output, a means for determining location, a processor, a non-transitory memory element accessible to the processor, a near-field communication chip-set, and a far-field communication chip-set. Optionally, a device can also have a global positioning system ("GPS") chip-set as a means of determining location. The devices belong to users.

The first computer-readable, non-transitory instruction set is stored in the non-transitory memory element of each of the plurality of devices. The second computer-readable instruction set is stored on the server. The first computer-readable, non-transitory instruction set is initiated by a user using the input of a user device. The second computer-readable, non-transitory instruction set is a runtime infinite loop with a service interrupt, resident on the server. In practice, the second computer-readable, non-transitory instruction set runs all the time, accepting inputs from the plurality of devices.

A user may initiate the first computer-readable, non-transitory instruction set located on the first device by using the input of the first device. Whereupon the processor of the first device executes the first computer-readable, non-transitory instruction set, causing the first device to determine its location; advertise or broadcast the first device's unique identifier; and send its location to the server. A unique identifier exists for each device using the near-field wireless communication protocol. The first computer readable, non-transitory instruction set and the second computer-readable, non-transitory instruction set then go through the remainder of the method as disclosed above.

BRIEF DESCRIPTION OF THE DRAWINGS

The present invention is illustrated with 4 drawings on 4 sheets. The accompanying drawings, which are incorporated in and constitute a part of this disclosure, illustrate various example embodiments. In the drawings.

DETAILED DESCRIPTION OF THE DRAWINGS

Figure 1:
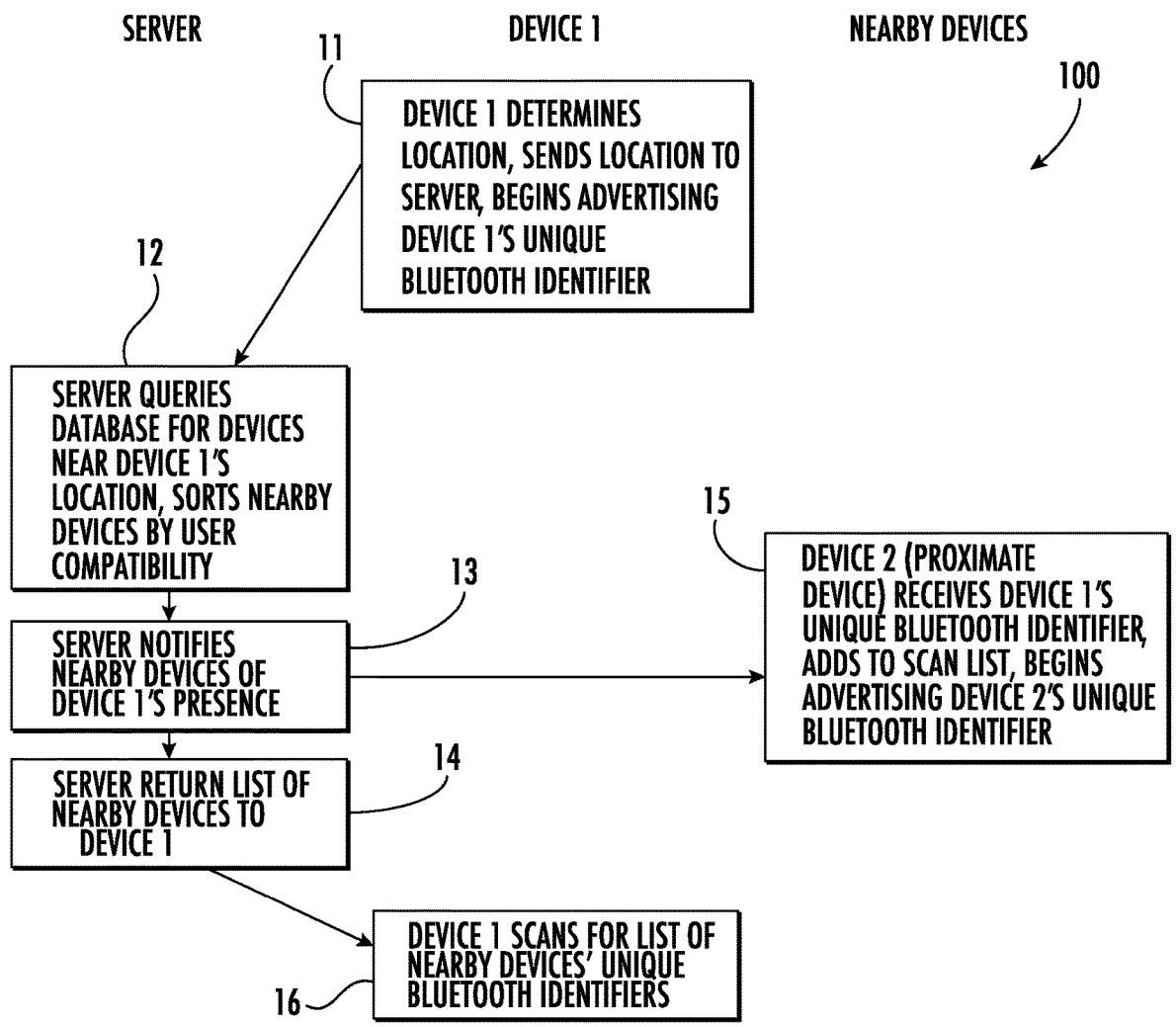
FIG. 1 is a high-level flow chart of the searching routine of the present invention, a system and method for in-person matching based on proximity.

The following descriptions are not meant to limit the invention, but rather to add to the summary of invention, and illustrate the present invention, a system and method for in-person matching based on proximity. The present invention is illustrated with a variety of drawings showing the primary embodiments of the present invention, with various diagrams and figures explaining its workings.

Certain terminology is used in the following description for convenience only and is not limiting. The article "a" is intended to include one or more items, and where only one item is intended the term "one" or similar language is used. To assist in the description of the present invention, words such as before, after, first, second, near, far, short, long, top, bottom, side, upper, lower, front, rear, inner, outer, right and left are used to describe the relative sequence, order, proximity, size and orientation of aspects of the present invention, a system and method for in-person matching based on proximity. The terminology includes the words above specifically mentioned, derivatives thereof, and words of similar import.

The following detailed description refers to the accompanying drawings. Wherever possible, the same reference numbers are used in the drawings and the following description to refer to the same or similar elements. The embodiments of the claimed subject matter may be described, modified, and adapted, and other implementations are possible. For example, substitutions, additions, or modifications, which perform identical functions to the embodiments disclosed, may be made to the elements illustrated in the drawings. Accordingly, the following detailed description does not limit the claimed subject matter. The proper scope of the claimed subject matter is defined by the claims contained herein. The claimed subject matter improves over the prior art by providing a system and method for in-person matching based on proximity.

Figure 2:
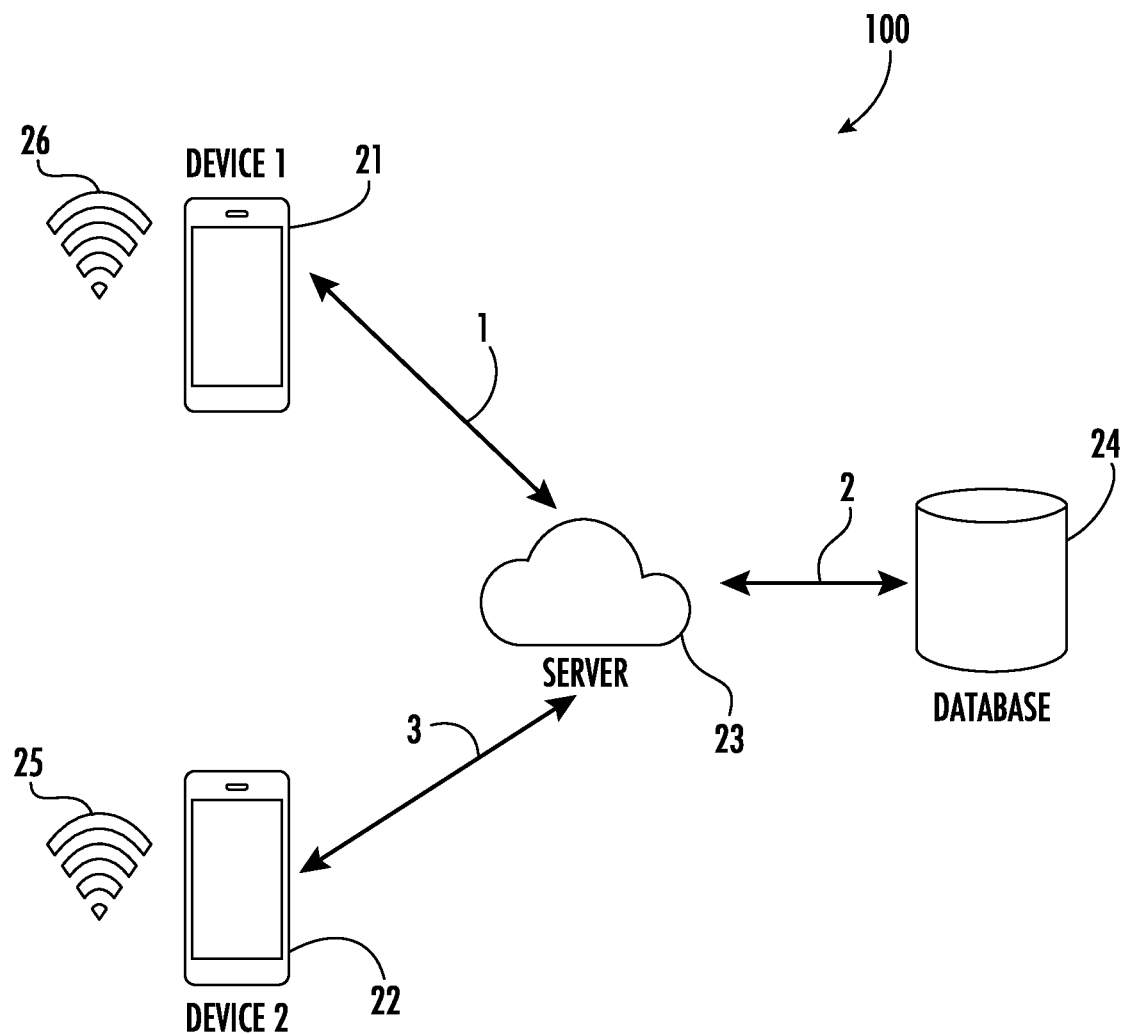
FIG. 2 is a communication diagram of the present invention while the devices are searching.

FIG. 1 shows a high-level flow chart of the search routine architecture of the present invention. FIG. 2 is a communications protocol of the search routine.

Prior to using the present invention 100, a system and method for in-person matching based on proximity 100, a user would register answering questions related to demographics and interests, in order to create a compatibility profile. A user may create a narrow compatibility profile, allowing only those sharing substantially similar demographic and interest profiles to be matched with the user. A user may also create a broad compatibility profile, essentially allowing anyone in near proximity to be matched with the user.

The user has a user device, referred to here as the first device 21. The user of the first device 21 wants to meet someone in near proximity. The maximum effective transmission radius of Class 1 Bluetooth is 100 meters. The maximum effective transmission radius for a single WiFi router in an open space is approximately 300 ft, or about 90 meters. From a practical standpoint, near proximity in this case means something no more than an order of magnitude greater than the maximum effective transmission radius that a near-field wireless communication protocol, such as Bluetooth or Wi-Fi, can broadcast. In other words, from a practical standpoint, near proximity means something within 1000 meters. Near proximity matching would be ideal for forums such as a museum, a store, a gym, a university building, a library, and the like.

The first device 21 performs the first three steps of the method 11. The first device 21 determines 11 its location; advertises itself by its unique identifier 26, such as a Bluetooth identifier 26; and sends 11 is location to the server 23 via a communication channel 1. The first device 21 advertises 11 its unique identifier 26 by broadcasting the same.

The server 23 receives the first device's 21 location information and interprets it as a request to meet those in near proximity. The server 23 sends 2 a query 12 to the database 24, requesting devices near the first device 21. The server sorts 12 the results of the query 12 by user compatibility. The server 23 then notifies 13 devices, such as the second device 22, of the first device's 21 presence and desire to meet, using a communication channel 3.

In the embodiment shown in FIGS. 1-2, the second device 22 receives 15 the first device's 21 unique identifier 26, which the second device 22 adds to its scan list 15. The notification 15 to the second device 22 would tell the second device 22 about the interests of the user of the first device 21, along with their demographic details. Upon receiving the first device's 21 unique identifier 26, the second device 22 begins advertising its own unique identifier 25 if it had not already in an active state.

The server 23 also returns a list 14 of nearby devices to the first device 21, using the communication channel 1. Upon receiving the return list 14, the first device 21 scans 16 the list 14 for the unique identifier of nearby devices.

Figure 3:
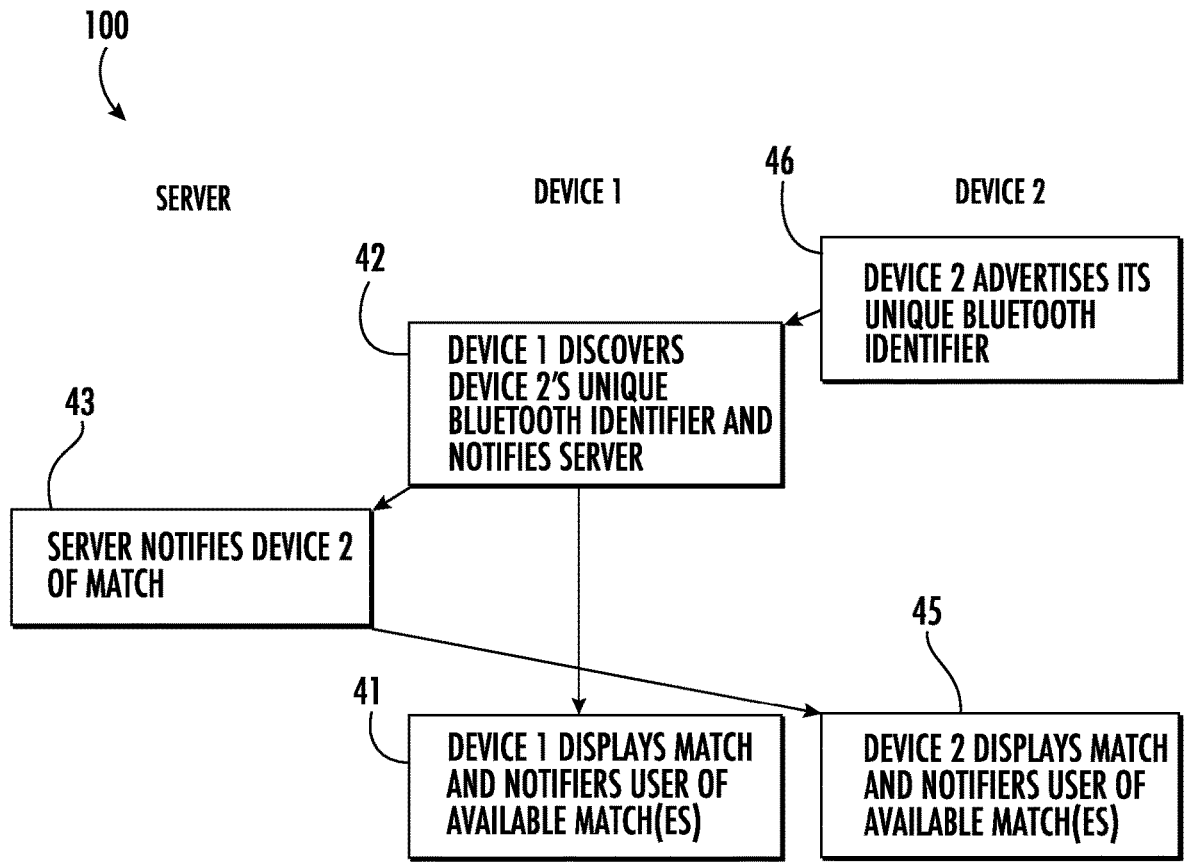
FIG. 3 is a high-level flow-chart of the matching routine of the present invention, a system and method for in-person matching based on proximity.
Figure 4:
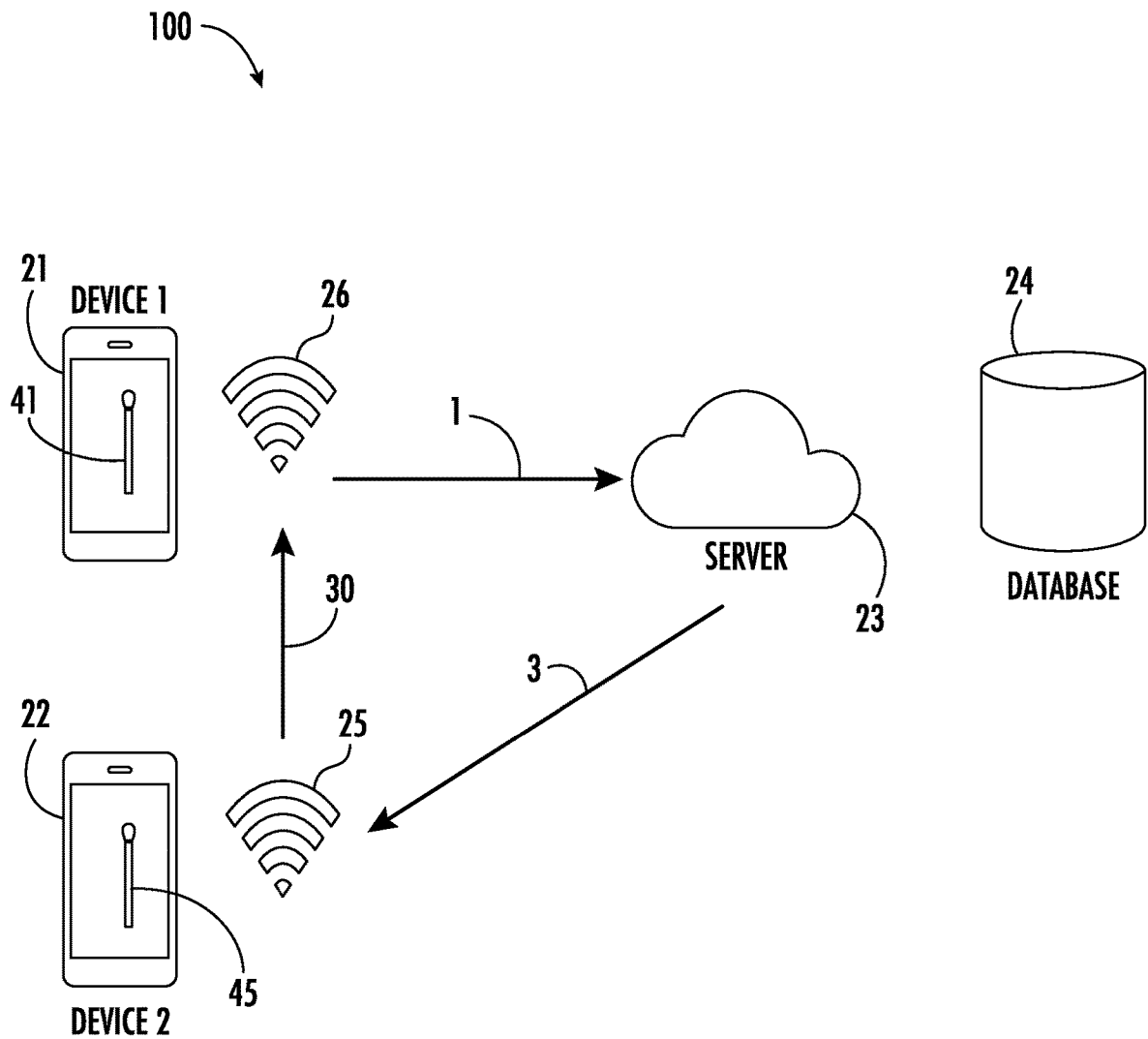
FIG. 4 is a communication diagram of the devices and communications channels during the matching routine.

Referring to FIGS. 3-4, once the first device 21 and second device 22 have each received a scan list 15, 16 from the server 23, and both devices 21, 22, have begun advertising 11, 15 their respective unique identifiers 26, 25, the users 21, 22 may match 41, 42 themselves, if interested.

This is done, for example, by the second device 22 advertising 46 its unique identifier 25. The first device 21 discovers 42 the second device's 22 unique identifier 25 and notifies 42 the server 23 using the communication channel 1. The server 23 notifies 43 the second device 22 of the match 45 using the communication channel 3. The first device 21 displays the match 41 and notifies the user of the available match(es) 41. When both users 21, 22, accept the match 41, 45, the first device 21 and the second device 22 communicate to each other directly 30 using the near field communication channel 30. The above can be easily extended to any number of user devices present within near proximity, as it is defined herein. For example, if the scan list 15, 16 contained n unique identifiers 25 26, a user could select any number between 0 and n. In other words, a user could select no one (0); a user could select everyone on the scan list (n); or a user could select an intermediate number (n−x), where x is an integer such that 0<x<n.

The system is comprised of a plurality of devices 21, 22 having the ability to transmit and receive using a near-field wireless communication protocol 30, such as Bluetooth and Wi-Fi, as well as the ability to transmit and receive using a far-field wireless communication protocol 1, 3, such as cellular or satellite; a server 23 having, at least, a processor and a non-transitory memory element; a database 24 accessible to the server; a first computer-readable, non-transitory instruction set; a second computer-readable, non-transitory instruction set; a near-field communication channel 30; and a far-field wireless communication channel 1, 3. Each of the plurality of devices 21, 22 has an input, an output, a processor, a means for determining location, a non-transitory memory element accessible to the processor, a near-field communication chip-set, and a far-field communication chip-set. The devices 21, 22 belong to users. The means for determining location can be one of a global positioning system chip-set; a location system based on wi-fi; or a location system based on the proximity to a cellphone tower.

The first computer-readable, non-transitory instruction set is stored in the non-transitory memory element of each of the plurality of devices 21, 22. The second computer-readable instruction set is stored on the server 23. The first computer-readable, non-transitory instruction set is initiated by a user using the input of a user device 21, 22. The second computer-readable, non-transitory instruction set is a runtime infinite loop with a service interrupt to stop it. In practice, the second computer-readable, non-transitory instruction set runs all the time, accepting inputs from the plurality of devices 21, 22.

A user may initiate the first computer-readable, non-transitory instruction set located on the first device 21 by using the input of the first device 21. Whereupon the processor of the first device 21 executes the first computer-readable, non-transitory instruction set, causing the first device 21 to determine 11 its location; send 11 its location to the server 23, and advertise 11 or broadcast the first device's unique identifier 26. A unique identifier 26 exists for each device 21, 22, using the near-field wireless communication protocol 30. The first computer readable, non-transitory instruction set and the second computer-readable, non-transitory instruction set then go through the remainder of the method as disclosed above.

Embodiments may be described above with reference to functions or acts, which comprise methods. The functions/acts noted above may occur out of the order as shown or described. For example, two functions/acts shown or described in succession may in fact be executed substantially concurrently or the functions/acts may sometimes be executed in the reverse order, depending upon the functionality/acts involved. While certain embodiments have been described, other embodiments may exist. Further, the disclosed methods' functions/acts may be modified in any manner, including by reordering functions/acts and/or inserting or deleting functions/acts, without departing from the spirit of the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A method for in-person proximity matching comprising the steps of
    creating user compatibility profiles for each of a plurality of users, wherein a comparison of two or more profiles can establish the relative compatibility of the users;
    determining the location of a first user device;
    sending the location of the first user device to a server using a far-field, wireless communication protocol;
    advertising the presence of the first user device at the location using a unique identifier assigned to the first user device by a near-field, wireless communication protocol, wherein the near-field, wireless communication protocol is characterized by a maximum effective transmission radius;
    querying for devices within a 1000 meter ("near proximity") radius to the first user device;
    sorting the results of the query by user compatibility;
    returning the sorted list, called a scan list, to the first user device;
    selecting, from a first user device's scan list containing n unique near-field identifiers, n−x unique near-field identifiers, where $0 \leq x \leq n$; and
    adding the first user device to a scan list maintained by each device so notified.

2. The method for in-person proximity mating in claim 1, further comprising the step of notifying any device of a user with a compatibility profile within near proximity of the presence of the first user device.

3. The method for in-person proximity matching in claim 1, further comprising the step of selecting the unique near-field identifier of a second user device from the scan list of the first user device.

4. The method for in-person proximity matching in claim 3, further comprising the step of selecting the unique near-field identifier of the first user device from the scan list of the second user device.

5. The method for in-person proximity matching in claim 4, further comprising the step of matching the first user device and the second user device.

6. The method for in-person proximity matching in claim 5, further comprising the step of enabling communication directly between the first user device and the second user device using the near-field communication channel.

7. The method for in-person proximity matching of claim 1, further comprising the step of matching at least one of the n−x unique near-field identifiers with the first user device.

8. The method for in-person proximity matching of claim 7, further comprising the step of matching n−x unique near-field identifiers with the first user device.

9. A system for in-person proximity matching comprising
    a near-field communication channel supporting a near-field communication protocol having a maximum effective transmission radius;
    a plurality of user electronic device, wherein each user electronic device is comprised of an input, an output, a means for determining location, a processor, a non-transitory memory element, a chipset enabling the transmission and reception of a signal supporting the near-field wireless communication protocol; and a chipset enabling the transmission and reception of a signal supporting a far-field wireless communication protocol;
    a server having, at least, a processor and a non-transitory memory element;
    a database, having a non-transitory memory element, which is accessible to the server;
    a first non-transitory, computer-readable instruction set;
    a second non-transitory, computer-readable instruction set; and
    a far-field communication channel;
    wherein the first non-transitory, computer-readable instruction set is resident on the non-transitory memory of each of the plurality of user electronic devices;
    wherein the second non-transitory, computer-readable instruction set is resident on the non-transitory memory of the server;
    wherein a unique compatibility profile is associated with each of the plurality of user electronic devices;
    wherein the execution the first non-transitory, computer-readable instruction set by the processor of the first user electronic device and the execution of the second non-transitory, computer-readable instruction set by the processor of the server will identify for the first user electronic device all other user electronic devices that have compatibility profiles within near proximity of the first user electronic device;
    wherein the plurality of user electronic devices includes the first user electronic device and n additional user electronic devices; and
    wherein, based on the compatibility profile associated with each of the remaining n additional user electronic devices, the first user device selects x number of user electronic devices, where $0 \leq x \leq n$.

10. The system for in-person proximity matching of claim 9, wherein the near-field communication protocol is Bluetooth.

11. The system for in-person proximity matching of claim 9, wherein the near-field communication protocol is Wi-Fi.

12. The system for in-person proximity matching of claim 9, wherein the means for determining location for the first user electronic device is a GPS chip-set.

13. The system for in-person proximity matching of claim 9, wherein each of the plurality of user electronic devices can only communicate with the server using the far-field communication channel.

14. The system for in-person proximity matching of claim 13, wherein the far-field communication channel is cellular.

15. The system for in-person proximity matching of claim 9, wherein the first user electronic device is matched with at least one of the additional user electronic devices.

16. The system for in-person proximity matching of claim 15, wherein the first user electronic device is enabled to communicate with the devices to which it is matched, using the near-field communication channel.

* * * * *